(12) United States Patent  
Woodrow

(10) Patent No.: US 9,937,403 B2  
(45) Date of Patent: Apr. 10, 2018

(54) GOLF TRAINING AID

(71) Applicant: Fitz Woodrow, Charlottesville, VA (US)

(72) Inventor: Fitz Woodrow, Charlottesville, VA (US)

(73) Assignee: Fitz Woodrow, Lexington, SC (US)

( * ) Notice: Subject to any disclaimer, the term of this patent is extended or adjusted under 35 U.S.C. 154(b) by 0 days.

(21) Appl. No.: 15/390,223

(22) Filed: Dec. 23, 2016

(65) Prior Publication Data

US 2017/0189783 A1 Jul. 6, 2017

Related U.S. Application Data

(60) Provisional application No. 62/273,557, filed on Dec. 31, 2015.

(51) Int. Cl.
```
A63B 69/36      (2006.01)
G02B 7/02       (2006.01)
G03B 17/56      (2006.01)
F16M 11/04      (2006.01)
F16M 11/08      (2006.01)
F16M 11/28      (2006.01)
F16M 11/38      (2006.01)
F16M 13/00      (2006.01)
F16B 7/14       (2006.01)
```

(52) U.S. Cl.
CPC ...... *A63B 69/3641* (2013.01); *A63B 69/3667* (2013.01); *F16M 11/046* (2013.01); *F16M 11/08* (2013.01); *F16M 11/28* (2013.01); *F16M 11/38* (2013.01); *F16M 13/00* (2013.01); *G02B 7/02* (2013.01); *G03B 17/561* (2013.01); *A63B 2069/3626* (2013.01); *A63B 2069/3679* (2013.01); *A63B 2220/05* (2013.01); *F16B 7/14* (2013.01); *F16M 2200/08* (2013.01)

(58) Field of Classification Search
USPC ................. 473/218, 219, 257, 258, 261–272
See application file for complete search history.

(56) References Cited

U.S. PATENT DOCUMENTS

| | | | |
|---|---|---|---|
| 5,375,833 A * | 12/1994 | Marier, Jr. ......... | A63B 69/3623 473/257 |
| 5,720,669 A * | 2/1998 | Pearson ............. | A63B 69/3623 473/265 |
| 7,670,231 B1 * | 3/2010 | Greene .............. | A63B 69/3676 473/220 |
| 8,216,080 B2 * | 7/2012 | Park ................... | A63B 69/3608 473/218 |
| 2005/0197199 A1 * | 9/2005 | Cardosi ............. | A63B 69/3641 473/257 |

(Continued)

*Primary Examiner* — Nini Legesse  
(74) *Attorney, Agent, or Firm* — Merchant & Gould PC

(57) ABSTRACT

A golf training aid comprising a base, a support arm, and an alignment rod or guide, wherein the base is positioned in front of the target golf ball when the golfer is in position behind the target golf ball. The arm is attached to the base and is normal to the direction of the stroke or swing, wherein the alignment rod or guide is held by the support arm directly above the target golf ball as viewed by the golfer. The system may further comprise an adjustable, telescoping, stationary, or detachable pole with a camera mount and/or camera attached to the pole top and may comprise a camera mount under the base.

9 Claims, 7 Drawing Sheets

(56) References Cited

U.S. PATENT DOCUMENTS

| | | | |
|---|---|---|---|
| 2008/0287206 A1* | 11/2008 | Kinney | A63B 69/3676 473/174 |
| 2011/0039629 A1* | 2/2011 | Smith | A63B 69/3641 473/258 |
| 2015/0038248 A1* | 2/2015 | Deacon | A63B 69/3641 473/220 |

* cited by examiner

GOLF TRAINING AID

CROSS REFERENCE TO RELATED APPLICATION

The present application claims priority to U.S. Provisional Application 62/273,557, filed Dec. 31, 2015, entitled "GOLF TRAINING AID", which is incorporated herein by reference in its entirety.

BACKGROUND OF THE INVENTION

Many factors influence the successful execution of a golfer's full swing or putting stroke, but consistency is essential. Quality practice is more important than quantity practice as a golfer interested in mere quantity of practice is in danger of practicing a consistently bad stroke.

There are many different ways to hit a golf ball, not one method designated as the proper way, but there are a few constants. For example, in a full swing, positing the ball and assuring the club head is square at impact are critical. For a putting stroke, the golfer's head should be held still with his line of sight vertically above the ball during the entire stroke, wherein the stroke becomes consistent, repeatable and routine. A golfer's full swing and putting stroke are reliant on muscle memory when on a golf course during play and golfing aids are not in use. Therefore it is crucial to develop correct and consistent muscle memory.

There are multiple golfing aids and training devices available with the goal of perfecting a golfer's full swing or putting stroke, but many are sufficiently complicated to require a permanent installation, wherein many golfers travel to different golf courses and practice their swing on the road. While other aids and training devices involve restraining the golfer, or require the golfer to focus on an area other than the golf ball. Unintended tweaks to the golfer's full swing or putting stroke may result when such training aids are removed and may impact the muscle memory of the golfer's swing.

SUMMARY OF THE INVENTION

The present invention relates to a golf training device comprising a base, an arm which extends from the base normal to the golfer's swing when in use, and an alignment device which positions an alignment guide at about 90 degrees in relation to the arm. The device can further comprise a camera mount(s) for cameras or an attachment for a camera pole or telescoping camera pole or camera(s), and an arm attached to an alignment device, i.e. alignment connector, alignment guide or both. The golf training device may or may not use a voice controlled wireless connection device to "connect" the user to the camera or video equipment to make use by an individual person easier.

In one embodiment, the golf training aid comprises a base, a support arm, and an alignment rod or guide, wherein the base is positioned in front of the target golf ball when the golfer is in position behind the target golf ball. The arm is attached to the base and is normal to the direction of the stroke or swing, wherein the alignment rod or guide is held by the support arm directly above the target golf ball as viewed by the golfer. The system may further comprise an adjustable, telescoping, stationary, or detachable pole with a camera mount and/or camera attached to the pole top and may comprise a camera mount under the base.

In a first aspect, the training device aids the golfer in verifying that the putting stroke, as practiced, is correct. This is done without interfering with muscle memory as the golfer's head is kept still and alignment of the swing can be verified while focusing the golfer's eyes on the golf ball. Removal of the putting aid does not result in any tweaks to the putting stroke and muscle memory can be relied on during play. In a second aspect, the unit is portable and easily carried with the golfer's equipment when traveling. In a third aspect, the alignment guide may be a putting rod commonly carried by traveling golfers. In a fourth aspect, the alignment guide may be a laser to allow training of full swings. In a fifth aspect, the golf training device comprises a method for creating a video of the golf swing, either the golfer's putting stroke or a full swing, allowing the golfer to utilize one of the most powerful training aids, the camera, without a trainer or coach present to film the golfer in practice.

The base of the golf training device, when used with the alignment guide, is generally on the opposite side of the ball than the golfer, which is a distinction to other golf alignment guides. The base comprises an arm that extends to hold an alignment device, wherein the alignment device may comprise an alignment rod or other alignment guide such as a laser directly over the target golf ball and aligned along the path the golfer's club should travel. The support arm acts as a reference point for ball position as well as the holder for the alignment rod or laser. The rod or guide is a sufficient height above the ground to allow the golfer's putter to pass under the alignment rod, generally about 4 inches although lower or higher is possible. If an alignment laser is used, the laser would project along the ground from a few inches above the golf ball. A full swing may be practiced as the laser would allow the club to pass through the alignment guide. With either an alignment rod or an alignment laser, the alignment guide would allow the golfer to view the accuracy of their stroke or swing, yet the golfer's head is not required to move and the golfer's eyes would never leave the golf ball to track the club along an alignment guide as is required when the alignment guide is spaced away from the golf ball. As no part of the training aid touches the golfer, golf club, or golf ball, and no adjustment to the golfer's eyes or head position is required to view the club in relation to the alignment guide, the muscle memory developed while utilizing the golf training aid is maintained on the golf course during play.

The alignment guide is defined as a visible line, real (as in a solid rod) or virtual (as in a projected laser light), extending along the stroke path followed by the golfer's stroke or swing, wherein the alignment guide is set directly above the target golf ball, i.e. defined as the golf ball positioned in place, intended to be hit by the golfer's club. Further, the alignment guide is defined to have the following properties. The alignment guide allows the golfer's club to pass below the alignment guide unimpeded. The alignment guide allows the golfer, when in position to hit the target golf ball with head down looking down directly at the target golf ball, to see the alignment guide passing directly over the target golf ball and at least a portion of the target golf ball simultaneously. The golfer is able to see the golf club pass under the alignment guide. In the case of a virtual line, the golf club passing under the alignment guide is defined as the virtual line is projected onto the club as the stroke is completed. The front of the alignment guide is defined as the side opposite the position of the golfer. Back of the alignment guide is defined as the side where the golfer takes position to hit the target golf ball.

Alignment connector is defined as a connecting mechanism that stably holds an alignment guide, comprising a rod, stick, laser or other tool, to create a visible, real or virtual, line in a position as described above in the definition of alignment guide and wherein the visible line, when the alignment guide is connected to the connecting mechanism, has the properties and performs all the functions as described in the definition of alignment guide above.

Alignment device is defined as one of the following 1) comprising an alignment connector, 2) comprising an alignment connector and an alignment guide, 3) comprising an alignment guide.

Camera mount is defined as a mount that securely holds a smart phone or a mount that holds a digital camera or digital video camera, or a mount that holds any camera including video camera.

DETAILED DESCRIPTION

Figure 1:
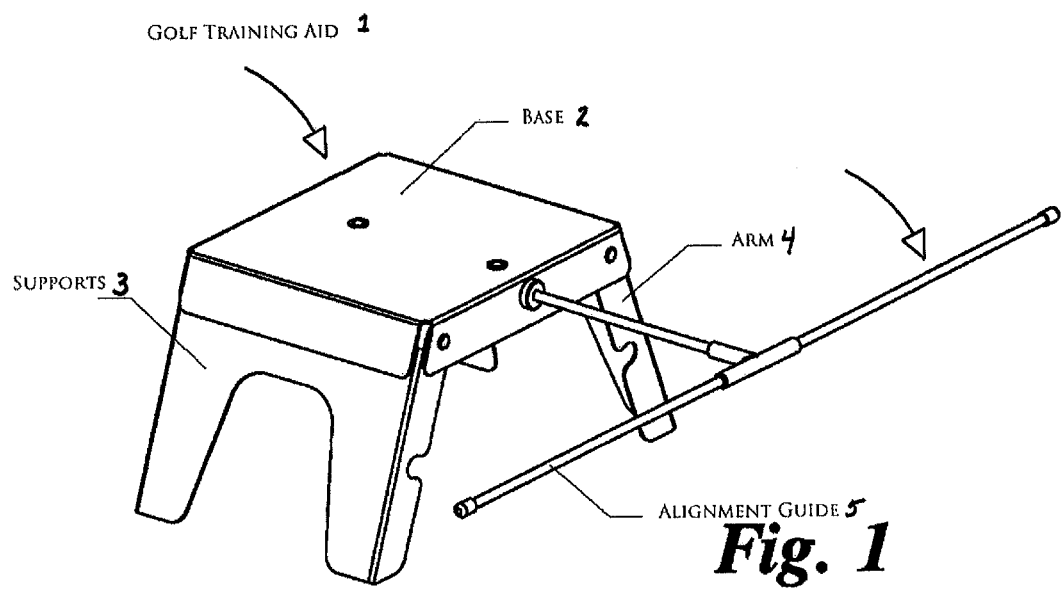
FIG. 1 is an economical, portable embodiment of the golf training device comprising a base, an arm normal to the golfer's swing, an alignment device including an alignment connector and an alignment rod, and an adjustable camera pole and holder.

Embodiments will be described in detail with reference to the accompanying drawings. However, since the embodiments described below can also be embodied in many alternate modes, it is easily understood by those skilled in the art that modes and details thereof can be variously changed without departing from the spirit and the scope of the present invention. Therefore, the present invention should not be interpreted as being limited to the following description of the embodiments. In the drawings, the same portions or portions having similar functions are denoted with the same reference numerals and description of said portions may not be repeated.

Figure 2:
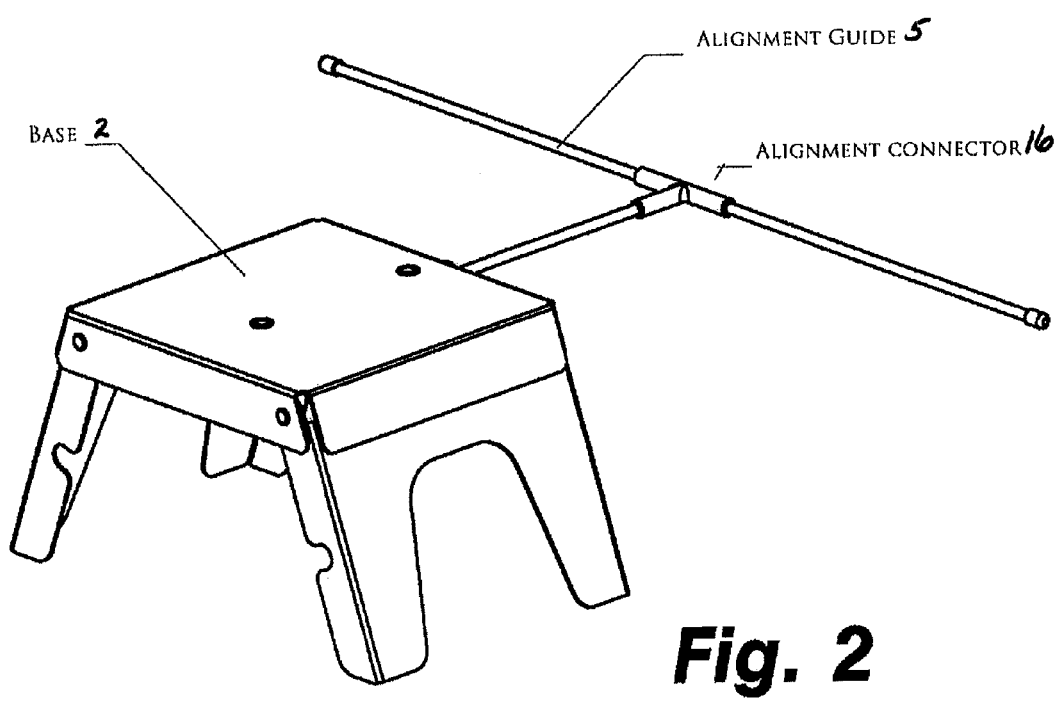
FIG. 2 is an alternate view of the golf training device of FIG. 1.

FIGS. 1 and 2 show an embodiment of the inventive golf training device (1). The device comprises a base (2) with end or side plates that serve as supports (3) or legs. The supports may be integrated into end or side plates as shown, may be simple pole legs or any other support method. The supports may be detached or folded for transporting or storage. The supports (3) are shown to be mounted at an angle greater than 90 degrees from the base (2) to increase the footprint and maintain stability, although supports or legs mounted at an angle of 90 degrees or less would be within the inventive concept of the golf training aid. Extending from the base, normal to the swing of the golfer is an arm (4) that supports an alignment device, wherein the alignment device comprises an alignment guide (5). The arm (4) may be permanently fixed, telescoping, retractable, detachable or foldable. The alignment connector (16) connects the arm to the alignment guide 5.

Figure 3:
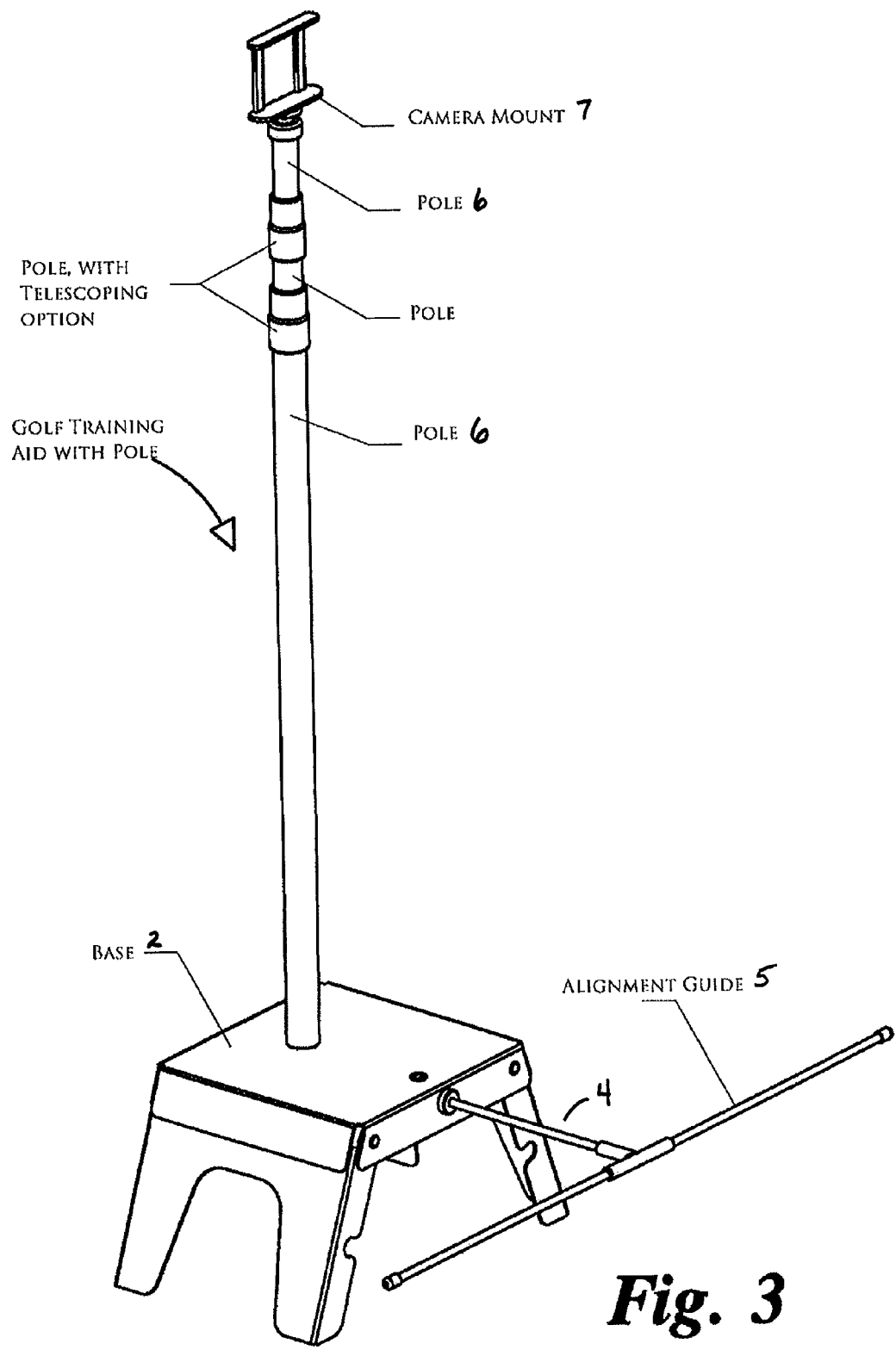
FIG. 3 is the golf training device of FIG. 1, further comprising a telescoping pole with a camera mount attached (detachable).

FIG. 3 shows one embodiment of the golf training aid wherein the base (2) supports a stationary or an extending, such as a telescoping, pole (6) that comprises a camera mount (7) that is able to securely hold a smart phone. In an alternate embodiment, a second camera mount and/or camera (not shown) may be mounted to the pole. The golfer stands opposite the base, behind the alignment guide (5). The golf training device may or may not use a voice controlled wireless connection device to "connect" the user to the camera or video equipment to make use by an individual person easier.

An alternate embodiment may comprise a camera mount (not shown) and/or camera under the base. One intended use would be to capture the ball coming off the putter face or clubface. The pole (6) may be stationary, detachable, telescoping or both detachable and telescoping. The camera mount (7) and the under base camera mount, if present, may be rotatable at least 180 degrees, preferably 360 degrees. By rotating the camera mount(s), the training device may serve as a simple support for a smart phone, or other camera/video device, when the alignment guide (5) is not used. In this mode, the golfer may stand in front of the base (2), opposite to the arm (4) and alignment guide (5).

In other alternate embodiments, the shape of the base may vary, for example the base may be square, rectangular, other polygonal shape or round. There is no restriction on the actual width or length of the base, but should comprise a sufficient footprint to hold the camera pole alignment guide in a stable position. The base may comprise multiple legs joining at a junction, such as a tripod, with a pole for the camera mount and an arm for the alignment device extending from the multiple legs, junction of the multiple legs or a platform at the junction of the multiple legs.

Figure 4:
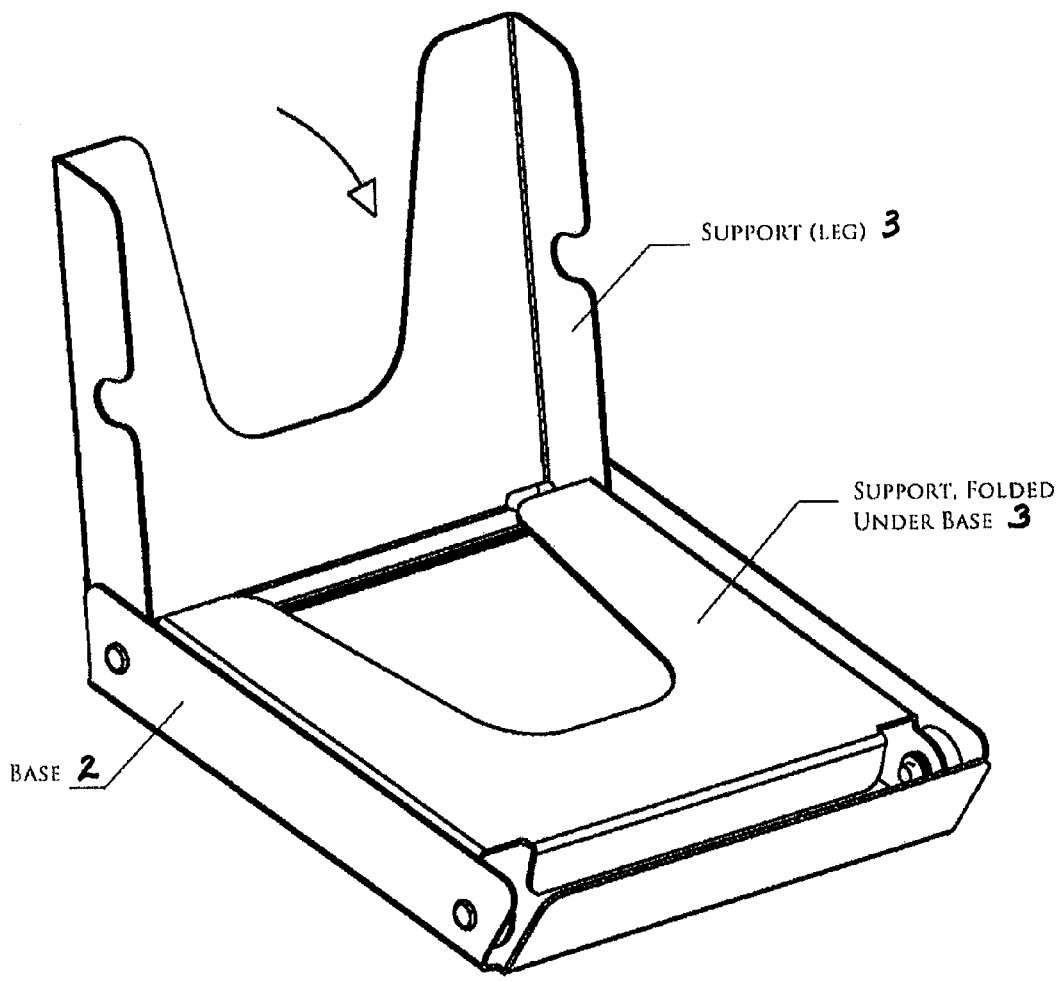
FIGS. 4 and 5 are views of the golf training device of FIG. 1 wherein the ends/legs are folded for transporting and storage.
Figure 5:
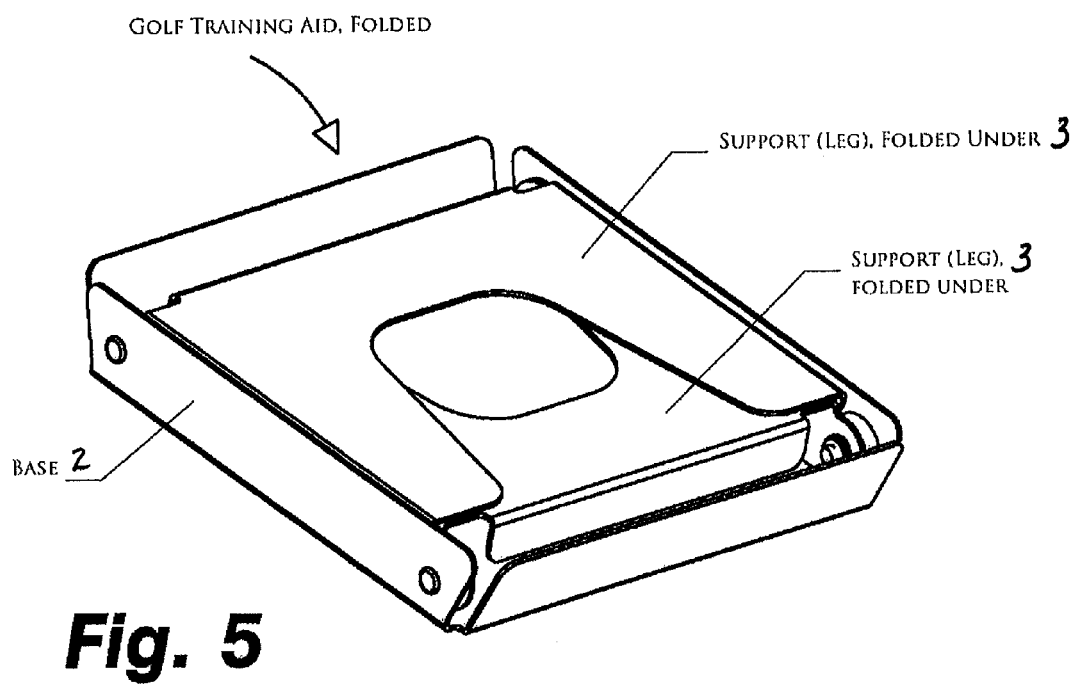

Supports (3) or legs are shown wherein the supports (3) or legs may be permanently attached, for example by rivets, detachable, for example held in place by a pin system, quick snap system or other mechanical fastener, or may be rotatably connected, for example a hinge, to allow folding of the legs under the base when not in use. FIGS. 4 and 5 show the supports (3) or legs in a folded position. The supports (3) or legs may taper toward the base and/or widen at the foot. The base (2) and supports (3) or legs may be formed of any material of sufficient strength and may be made of the same or different materials. In one embodiment, the supports (3) or legs may further comprise rubber, plastic, silicone, polymer composite, resin or non-skid end caps. Alternately, the legs may further comprise rubber, plastic, silicone, polymer composite, resin or non-skid base along the bottom of a support bottom or foot where the supports (3) or legs are intended to contact a floor, ground or other surface. In an alternate embodiment, the support bottom or foot may comprise a texture, such as grooves, to form a non-skid surface.

The arm (4) may be permanently fixed, telescoping, retractable, detachable or foldable. In one embodiment, the arm is detachable and may screw in place, may be held in place with a pin system or other fastener, or may penetrate the side plates, end plates, supports or legs and held in place by a pin system or other fastener underneath the base. In an embodiment not shown, an opening in the end plates, side plates, supports or legs may accommodate a retractable arm. The underneath surface of the base may comprise a securing mechanism for the arm (4) in the retracted position.

In one embodiment, the end of the arm extending away from the base comprises an alignment guide wherein the alignment guide comprises an alignment connector (16) for the alignment guide (5). The alignment connector (16) may comprise a clamp to hold a rod typical of a putter guide commonly carried by traveling golfers, light projecting laser or other alignment guide (5). The alignment connector (16) may be stationary and intended to hold the line formed by the alignment guide (5) at about 90 degrees to the arm, along the intended travel of the golf swing or stroke when in use. In an alternate embodiment, the alignment connector (16) may be rotatable to allow the golfer to position the line formed by the alignment guide (5). In an alternate embodiment, the alignment connector (16) may comprise a right angle adapter to hold a rod, light projecting laser or other alignment guide (5). The right angle adapter may also comprise a clamp and further may be stationary or rotatable.

Figure 6:
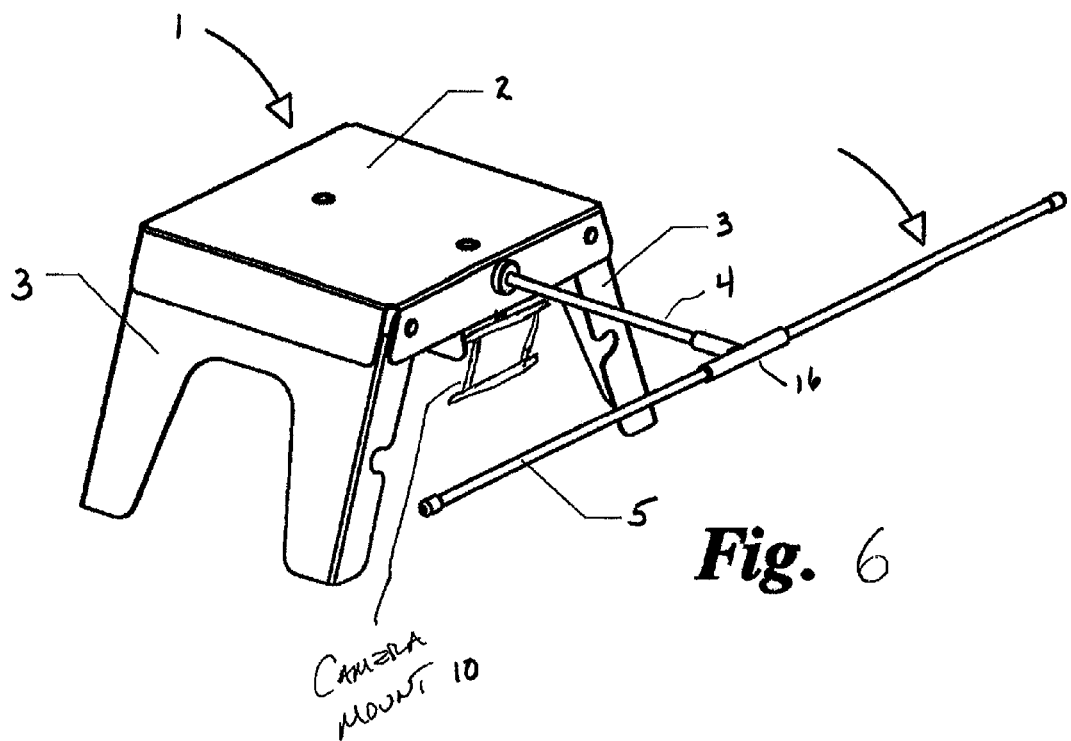
FIG. 6 is the same as FIG. 1, except showing an optional camera mount on the base.

FIG. 6 shows a golf training device (1) comprising a base (2) with supports/legs (3). An arm (4) extending from the base supports an alignment guide 5, which is connected to the arm (4) by an alignment connector (16). A camera mount (10) under the base is shown, as discussed above.

Figure 7:
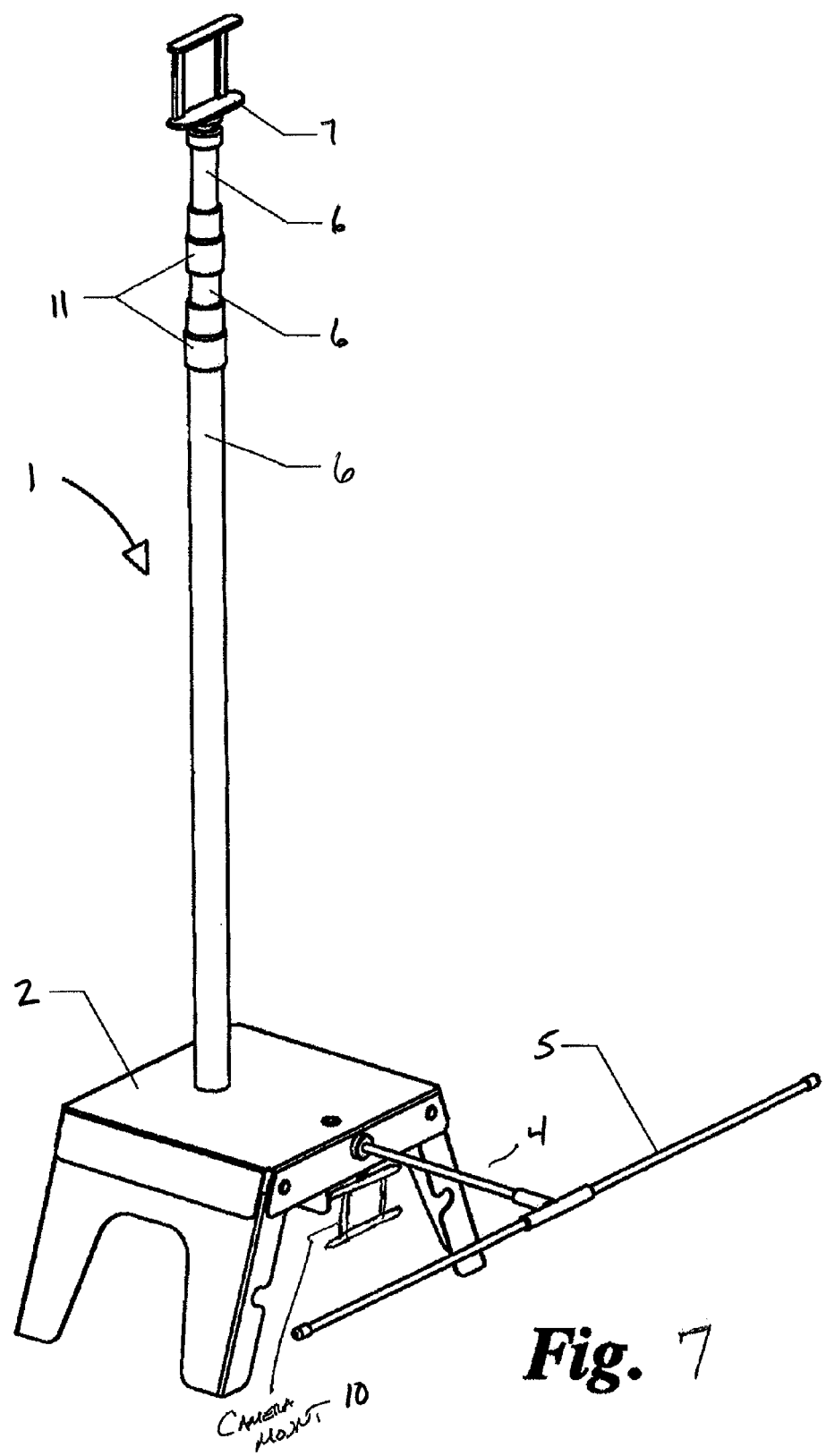
FIG. 7 is the same as FIG. 3, except showing an optional camera mount on the base.

FIG. 7 shows a golf training device (1) where the base (2) supports a stationary or extendible pole (6). At the top of the pole is a camera mount (7). Couplings (11) allow the pole to extend or telescope. The base (2) also has an arm (4) connected to an alignment guide 5. A camera mount (10) is also available under the base to hold a smartphone or other device, such as a video device.

A preferred economical version suitable for golfers to use during practice at home and during tournaments would comprise the alternatives wherein the golf training device is portable, has a clamp that functions as an alignment connector that clamps a rod, which may be a guide rod typically used by golfers, and a simple telescoping pole with a smart phone mount at the end of the pole.

Other preferred versions may comprise supports or legs with springs, a tool to create a visible virtual line from a laser comprising the alignment guide, level indicators, digital cameras including video cameras, and other enhancements. In one embodiment the alignment guide may extend at least 6 inches in the direction of the stroke or swing. In a preferred embodiment, the alignment guide may extend at least 12 inches in the direction of the stroke or swing. More preferably, the alignment guide may extend at least 1.5 feet in the direction of the stroke or swing.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is initial to be claimed:

1. A golf training device comprising:
   a base raised off the ground by supports or legs,
   a camera mount under the base so that a camera in the mount can capture a ball coming off a putter face or club face,
   a camera pole extending above the base with a camera mount at the end of the pole, wherein the camera pole is telescoping and optionally detachable,
   an arm which extends from the base normal to a golfer's swing when in use, and
   an alignment device which positions an alignment guide at about 90 degrees in relation to the arm.

2. The golf training device of claim 1, wherein the camera mount is a smart phone mount.

3. The golf training device of claim 1, wherein the camera mount is able to rotate at least 180 degrees.

4. The golf training device of claim 1, wherein the camera mount comprises a camera or video device.

5. The golf training device of claim 1, wherein the alignment device comprises an alignment connector.

6. The golf training device of claim 1, wherein the alignment device comprises an alignment guide.

7. The golf training device of claim 1, wherein the base has foldable supports.

8. The golf training device of claim 1, further comprising a camera mount on the base of the device.

9. The golf training device of claim 1, further comprising a camera mount on the base of the device.

* * * * *